United States Patent [19]
Smith, Jr.

[11] Patent Number: 5,769,973
[45] Date of Patent: Jun. 23, 1998

[54] HIGH PERFORMANCE AUTOMOTIVE CLUTCH WITH MODIFIED PRESSURE PLATE FOR SUSTANINED INCREASED SPRING FORCE

[76] Inventor: Robert P. Smith, Jr., 10101 Canoga Ave., No. 5, Chatsworth, Calif. 91311

[21] Appl. No.: 612,135

[22] Filed: Mar. 7, 1996

Related U.S. Application Data

[60] Provisional application No. 60/006,490, Nov. 9, 1995.

[51] Int. Cl.$^6$ ................................................ C21D 8/02
[52] U.S. Cl. ................................ 148/563; 148/580
[58] Field of Search ................................ 148/563, 580

[56] References Cited

U.S. PATENT DOCUMENTS

| | | | |
|---|---|---|---|
| 3,668,917 | 6/1972 | Komatsu et al. | 72/342 |
| 3,753,798 | 8/1973 | Komatsu et al. | 148/580 |
| 4,132,103 | 1/1979 | LeBrise | 72/326 |
| 4,405,387 | 9/1983 | Albrecht et al. | 148/402 |
| 4,411,711 | 10/1983 | Albrecht et al. | 148/402 |
| 4,435,229 | 3/1984 | Johnson | 148/402 |
| 4,554,027 | 11/1985 | Tautzenberger et al. | 148/402 |
| 4,943,326 | 7/1990 | Ozawa et al. | 148/402 |
| 5,044,611 | 9/1991 | Beney et al. | 266/106 |
| 5,092,941 | 3/1992 | Miura | 148/402 |
| 5,198,041 | 3/1993 | Takemoto et al. | 148/402 |
| 5,226,979 | 7/1993 | Thoma | 148/402 |
| 5,265,919 | 11/1993 | Takemoto et al. | 285/381 |
| 5,492,576 | 2/1996 | Jehl et al. | 148/580 |

FOREIGN PATENT DOCUMENTS

| 465435 | 3/1975 | U.S.S.R. | 148/580 |
|---|---|---|---|

*Primary Examiner*—George Wyszomierski
*Attorney, Agent, or Firm*—Louis J. Bachand

[57] ABSTRACT

Belleville spring pressure plate of increased height for use in a high performance clutch assembly exerts a greater force than the original height plate, is usable without modification of the original clutch and is longer lasting in service after being thermally conditioned to a martensitic state to lose the memory of its original, lower height and stress tempered before being set in a new, increased height shape.

6 Claims, 1 Drawing Sheet

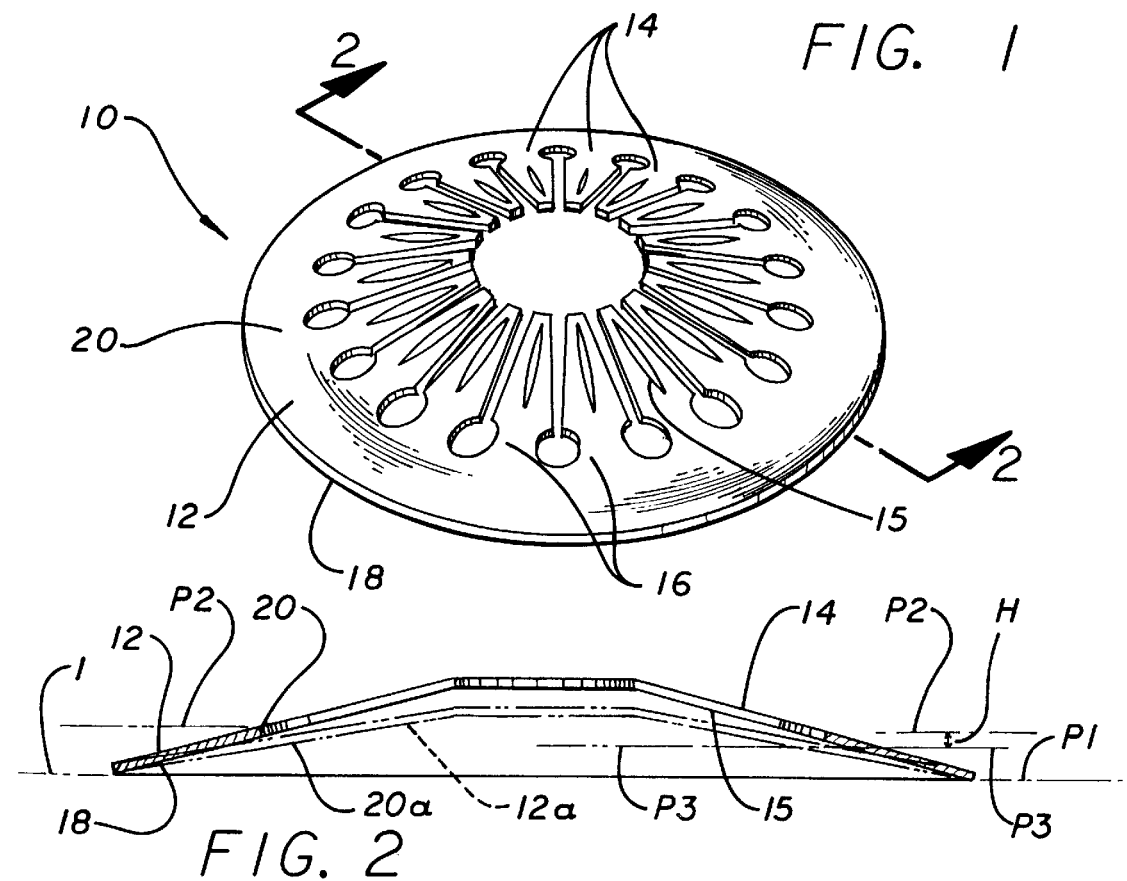
FIG. 1
FIG. 2
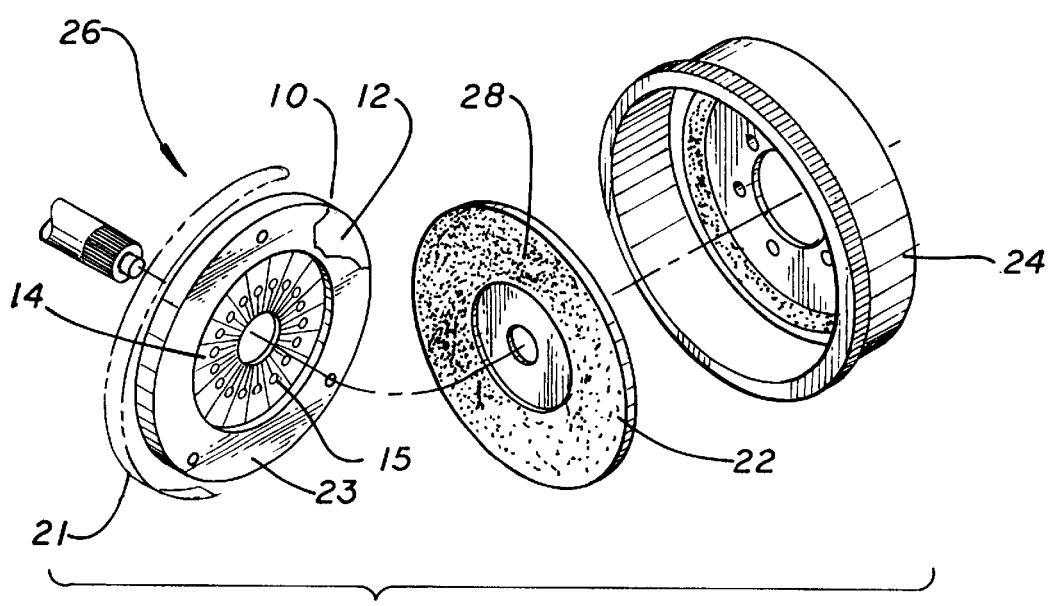
FIG. 3

HIGH PERFORMANCE AUTOMOTIVE CLUTCH WITH MODIFIED PRESSURE PLATE FOR SUSTANINED INCREASED SPRING FORCE

REFERENCE TO RELATED APPLICATION

This application claims the benefit of United States Provisional Application Serial No. 60/006,490 filed Nov. 9, 1995.

TECHNICAL FIELD

This application relates to automotive clutches and more particularly to specially modified pressure plates for high performance automotive clutches useful in high performance autos in both street and racing applications. In a particular aspect the invention relates to high performance pressure plates comprising a diaphragm or Belleville spring which is modified to exert, within the dimensional confines of the original clutch assembly, an increased force on the clutch disc engaging the clutch flywheel, and to maintain the ability to exert such increased force over a longer time than previously known Belleville spring type pressure plates in high performance clutches. Higher spring force means more forceful pressing of the clutch disc to the flywheel. This in turn reduces disc wear which results from slippage of the disc relative to the flywheel when torque loads exceed the ability of the pressure plate to keep the disc turning with the flywheel.

BACKGROUND OF THE INVENTION

Drivers wanting increased performance from their vehicles add turbocharging or nitrous oxide kits to the factory supplied power plant. Even factory turbocharged vehicles are sometimes modified for even greater performance, often by still further increases in horsepower and torque. The clutch is critical in transferring power to the vehicle wheels, and stock clutches are rarely able to long withstand the loads placed on them by the increased levels of power. In particular, clutch pressure plates may exert too little spring force to maintain engagement under severe loading, resulting in slippage, loss of power to the wheels and damage to the disc. Or, initial pressure plate spring force may precipitously decline over relatively short periods, allowing undue clutch wear and the rendering of the clutch inoperative after as little as 5,000 miles in race-used vehicles and after only 15,000 miles in street use.

Repeated clutch or clutch component replacement is prohibitively expensive. (Custom redesign of the clutch or clutch components to a longer-effective design is similarly expensive if design changes require a redimensioning of significant portions or all of the clutch or powertrain.

Many high performance clutches use a Belleville spring pressure plate. Belleville springs comprise an annulus adapted to engage the clutch disc with a particular designed force and to disengage the disc readily when the clutch is not to be engaged. For this purpose the Belleville spring pressure plate has an annular ring which defines the engagement surface, and an inner circumferential array of fingers which when pressed from a conical condition force the ring flat into engagement, or, over-center to a reverse cone and out of engagement.

SUMMARY OF THE INVENTION

It is accordingly an object of the invention to provide an improved automotive clutch particularly adapted to high performance applications. It is a further object to provide improvements in existing clutches with little or no modification of the clutch other than in the design of the Belleville spring pressure plate to make the clutches more effective and longer-effective in high performance use. Yet another object is to modify the generally available Belleville spring pressure plates in factory-supplied clutches to exert increased spring force enabling effective application of boosted power through the clutch. A still further object is to provide an increased high performance clutch having a modified Belleville spring pressure plate within the same housing and using the same disc as originally comprised the clutch. Yet another object is to increase clutch life in high performance vehicles.

Accordingly, it is an object of the invention to provide an after-market modification of existing clutches, specifically in the Belleville spring component of such clutches, which enables ready handling of increased torque, over a relatively longer period of usage, and does so within the original clutch dimensions, by increasing in a permanent manner the nominal cone height of the Belleville spring pressure plate and thus the spring force, and doing so only after removing from the plate all memory of its original nominal height, so as to block reversion to original condition and concomitant loss of spring force and long term effectiveness in high performance applications.

The successful modification of an original equipment Belleville spring pressure plate to exert increased spring force in its supplied clutch is surprising because the spring steel materials used in the Bellevilles tend to revert to their former shape and thus spring force levels over time owing to the shape memory in the Belleville. Reshaping therefore has not been a successful solution. In this invention, shape memory is removed from the Belleville spring pressure plate, the plate is reshaped into a higher force exerting configuration, and after installation and in use it does not revert to its former, less desirable configuration. Broadly, in carrying out the method aspects of the invention, the existing Belleville spring pressure plate intended for and provided for a given clutch is heat treated at a temperature and for a time sufficient to render the plate metal free of memory of its original form, quenched at low temperatures transforming the metal to the martensitic, not bainite, state, then reheated to stress temper, and then conformed with heat to a new, more effective shape which becomes its new permanent shape, and the only shape of which the plate has memory. The term "height" and its cognitives herein refer to the vertical extent of the Belleville spring pressure plate annular ring measured on a line extending normal to a lower plane in which all the lowest points of the outer circumference of the plate lie to an upper plane in which all the highest points of the inner circumference of the plate lie, and between the planes. Installed for use the Belleville spring pressure plate is compressed to a degree of flatness, with a spring force proportional to the compression used to flatten the normally conical configuration of the spring ring.

The foregoing and other objects of the invention to become apparent hereinafter are realized in a high performance automotive clutch having a flywheel, a clutch disc, and a pressure plate comprising a Belleville spring of increased spring force from its original spring force and free of memory of its original shape. In practice, the Belleville spring pressure plate is reshaped to have increased spring force through having an increased height, so as to exert an increased pressure in the clutch assembly, and thermally conditioned to remove any memory of the original shape. The pressure plate thus has no tendency to revert to the original, less high, less forceful, shape during use in a clutch, and thereby sustains its increased spring force over the useful life of the clutch.

More particularly, the invention provides in an automotive clutch having a flywheel, a disc and a Belleville spring pressure plate acting on the disc, a Belleville spring pressure plate of increased height from its original height, the pressure plate having been thermally conditioned to remove therefrom the memory of its original height, whereby the Belleville spring pressure plate does not revert to its original height with use and continues to exert the increased pressure associated with its new increased height during the life of the clutch.

In a more specific aspect, the Belleville spring pressure plate of an original shape having an original height is thermally conditioned by heating to a temperature of about 1500° F. for about 10–15 minutes, quenching in oil to a low temperature in the range of about 70°–140° F. to achieve therein a transformation to the martensitic state, stress tempering at about 500° to 700° F. e.g. for about an hour to increase ductility for the subsequent forming step, conforming the plate to a new shape of greater height in a fixture and heating for about two hours at about 750°–800° F., to permanently reshape the plate and temper to a hardness of about 42–48$R_c$.

In another embodiment of the invention, there is provided automotive clutch spring pressure plate of increased height from its original height, the pressure plate having been thermally conditioned to a martensitic state to remove therefrom the memory of its original lower height, whereby the Belleville spring pressure plate does not revert to its original height with use and continues to exert the increased pressure associated with its new increased height over the life of the clutch.

In the method aspects of the invention, there is provided a method of modifying an automotive clutch spring pressure plate to exert increased force in a clutch assembly over an extended time, including thermally conditioning the spring pressure plate in an original shape of a given height at a temperature and for a time sufficient in combination with a subsequent oil quench to a temperature of about 70° to 140° F. to transform the plate metal to the martensitic state to relieve the plate of its memory of its original shape, stress tempering free of any restraint, e.g. for about an hour, at a temperature of about 500° to 700° F., conforming the spring pressure plate in a press to a new shape of greater height than the given height, and heating for a time and at a temperature sufficient to set the spring pressure plate in its new shape free of memory of its original shape, and thereafter tempering to a desired hardness.

In this and like embodiments, there is also typically included selecting a heat treatable carbon steel comprising about 0.7–0.9 per cent by weight carbon, heating the pressure plate to a temperature of about 1500° F. for about 10–15 minutes, quenching in oil to a temperature to cool the plate to the above-indicated temperatures, heating for about an hour at about 500°–700° F. to increase ductility as above indicated, and thereafter further heating for about two hours at about 750°–800° F. while conformed to the desired new shape of greater depth to impart the new shape and temper the pressure plate to the desired hardness.

In a further aspect of the invention, the Belleville spring pressure plate fingers which are integral with the spring ring and which serve to deflect the ring to engage or disengage the disc are preferably rigidified against undue flexing which may accompany their increased height occasioned by the increased height of the spring ring. This is accomplished by stiffening the fingers along their longitudinal axes through addition of stiffening ribs or the formation in situ of such ribs by first annealing the plate until the fingers are deformable and then by pressing a die thereinto under forming pressure, and reforming the fingers to have upset ribs raised in the opposite surface of the fingers while a recess is formed in the die contacting surface, the rib acting to stiffen the fingers. It has been found that so ribbing the fingers tends to offset the increased finger flexibility that may be experienced when the angle to the vertical axis of the pressure plate ring is increased in accordance with the invention and the fingers are similarly increased in angle and height.

BRIEF DESCRIPTION OF THE DRAWINGS

The invention will be further described in conjunction with the attached drawings in which:

FIG. 1 is a perspective view of the clutch pressure plate according to the invention;

FIG. 2 is a view taken on line 2—2 in FIG. 1; and,

FIG. 3 is an exploded view of a clutch embodying the present clutch pressure plate.

DESCRIPTION OF THE PREFERRED EMBODIMENTS

With reference now to the drawings in detail, in FIG. 1, the invention pressure plate is shown as a Belleville spring pressure plate 10 having a perimeter ring 12, and a circularly disposed series of radial fingers 14 which terminate at 16 in contiguous relation with the ring. The radial fingers 14 have ribs 15 formed therein by die pressure along the longitudinal axis and upper surface of the fingers, for purposes to appear. The Belleville spring 10 in FIGS. 1 and 2 is shown dished with the outermost portion 18 of the spring ring 12 including a series of points all lying within a lower plane P1. The innermost portion 20 of the spring ring 12 includes a series of points all lying within an upper plane P2. Planes P1 and P2 are parallel to each other and they define respectively the lower and upper extremities of the spring ring 12.

In an original equipment, conventional pressure plate spring ring 12a, shown in FIG. 2 in phantom and before modification in accordance with the invention (solid line showing), the plane P3 includes a series of points which represent the relatively lower height of the innermost portion 20a of the spring ring 12a before modification. After the invention modification, the innermost portion 20 of the spring ring 12 intersects plane P2. The difference in height H between P2 and P3 ultimately provides the greater spring force noted above. Suitable increases in height H are in the 0.010 to 0.060 inch range, e.g. an original pressure plate spring ring is modified to have the gap G between plane P1 and P2 be 0.360 inch from the original 0.0320 inch (gap between planes P1 and P3), or from about 5% to 40% or more increase in height.

Fingers 14 project inward and upward from the ring innermost portion 20 as shown. The pressure plate spring ring 12 within cover 21 acts via pressure ring 23 upon the clutch disc 22, coupling the disc to the flywheel 24 in the assembled condition of the clutch 26, See FIG. 3. As shown in FIG. 3, the spring ring 12 of the clutch 26, is flattened to engage the disc surface 28 by pressure on the spring fingers 14 when the clutch 26 is assembled. In this condition the spring ring 12 urges the clutch disc 22 into flywheel 24. Overpressure on the spring fingers 14, snaps the spring ring 12 overcenter and may be used with appropriate levers to slightly separate the spring ring from the disc 22 allowing disengagement of the clutch disc.

The force between the spring ring 12 and the disc 22 is a function in part of the degree of flattening of the spring ring. With the height of the spring ring 12 relatively increased in accordance with the invention, there is that much more compression of the spring ring when reduced to a flat condition, as in FIG. 3. This means that there is greater spring force on the disc 22 for a given clutch 26 in which the only difference over the original clutch is that spring ring 12 height has been increased. This greater spring force enables the spring pressure plate ring 12 to maintain engagement with the disc 22 at a higher torque loading than possible with the original, unmodified ring 12a. This improves performance, and is achieved without changing the remainder of the clutch 26. That is, there is no increase in component diameter, no increase in material thickness, or other dimensional change in the spring pressure plate which would entail modification of other clutch components. The present invention thus is the most economical way to increase performance in the clutch assemblies of high performance vehicles, and is perfectly suited for after-market improvement in the clutches of high performance street vehicles.

Belleville spring 10 suitably comprises a carbon steel typically of the 10xx series, and particularly 1075, and contains, for example, from 0.7 to 0.9 weight per cent carbon. Such steels can be shaped under heat and have memory to retain the given shape. In the present invention, it is critical to remove the memory of the original shape before impressing a new shape on the spring 10, as otherwise the spring will revert over time to its original shape with the loss of improved properties and performance.

Accordingly, the invention method provides for heating the spring to an elevated temperature such as 1500° F. for a time such as 10–15 minutes at temperature and oil quenching at 70°–140° F. in a manner to reduce the steel to the martensite state in which it has no memory of its first shape. The plate is then heated free of restraint for about an hour at about 500°–700° F. or until the plate is stress tempered to a suitable ductility for the next step of conforming to the new shape. Thereafter, the steel is clamped in a fixture to give it its desired new shape and heated suitably at 750°–800° F. for about two hours to confer the increased ring height shape on the spring and give the steel a hardness of about 42–48$R_c$.

The foregoing process may be preceded by adding stiffening ribs 15 to the spring fingers 14. It has been found that the increased height of the ring 12 increases the height of the fingers 14 and that this added height in the fingers is accompanied in some instances by increased flexibility in the fingers. This flexibility is disadvantageous in precision operation of the clutch and in achieving separation of the spring ring 12 and the disc 22 upon clutch disengagement. The flexibility is controllable by the addition of ribs 15 along the longitudinal axis of the fingers 14. The rib 15 addition may be by application of separately or in situ formed material or by impressing a rib shape into the fingers 14. In the last case, the spring 10 is annealed to a suitable softness, a suitable die is used to reshape the fingers 14 to define ribs 15 therein, and the spring 10 is thereafter heat-treated as described above.

EXAMPLES

1. A Nissan 300 ZX twin turbo coupe used in sport racing which had been getting only 5000 miles on its original equipment clutch is modified to the extent of removing the stock spring pressure plate and installing modified spring pressure plate identical except that there was an increase the height of the clutch pressure plate ring by 0.030 inch, according to the invention process. The increased height was achieved by thermally conditioning the plate and quenching in oil to 70°–140° F. to transform the steel to martensite, stress tempering at 500°–700° F. for about an hour, and reshaping to the new height by heating in a press for about two hours at 750°–800° F. to an $R_c$ hardness between 42 and 48. After installation of the modified pressure plate, the life of the clutch is doubled and slippage under maximum torque conditions is substantially eliminated during the life of the clutch.

2. A Honda coupe having a nitrous oxide kit boosting horsepower from 100 to 160 is provided with a clutch having a pressure plate spring modified in accordance with the invention. Typical clutch spring replacement cycles of 15,000 miles are doubled to 30,000 miles. There is effective transfer of even maximum torque without slippage or undue clutch wear during the life of the clutch.

The foregoing objects of the invention are thus met.

I claim:

1. Method of modifying an original shape automotive clutch spring pressure plate diaphragm comprising steel in the bainite state to allow said diaphragm to exert increased force in a clutch assembly over an extended time, including thermally conditioning the spring pressure plate diaphragm in its original shape of a given height at a temperature and for a time sufficient to transform said spring pressure plate diaphragm steel to a martensitic state and remove from said spring pressure plate diaphragm its memory of its original shape, stress tempering said spring pressure plate diaphragm without restraining it, and thereafter conforming said spring pressure plate diaphragm in a press to a new shape of greater height than said given height, and finally heating for about 2 hours and at a temperature of about 750°–800° F. sufficient to set said spring pressure plate in its new shape.

2. The method according to claim 1, including also selecting as said pressure plate diaphragm steel a heat treatable carbon steel comprising about 0.7–0.9 weight per cent carbon.

3. The method according to claim 1, in which said thermal conditioning includes heating said pressure plate to a temperature of about 1500° F. for about 10–15 minutes and oil quenching to a temperature of 70°–140° F. for transformation from a bainite state to said martensitic state.

4. The method according to claim 3, in which said stress tempering of said pressure plate diaphragm is effected for about an hour at about 500°–700° F.

5. The method according to claim 4, in which said spring pressure plate diaphragm comprises a ring and a series of fingers projecting from said ring and including also forming a rib on each finger in finger stiffening relation before the final heating of said spring pressure plate diaphragm.

6. The method according to claim 1, in which said spring pressure plate diaphragm comprises a ring and a series of fingers projecting from said ring, and including also forming a rib on each finger in finger stiffening relation before the final heating of said spring pressure plate diaphragm.

* * * * *